United States Patent
Hasenour

(10) Patent No.: US 11,122,933 B2
(45) Date of Patent: Sep. 21, 2021

(54) GREASE PAN EXPANSION ASSEMBLY

(71) Applicant: Brian Hasenour, Jasper, IN (US)

(72) Inventor: Brian Hasenour, Jasper, IN (US)

( * ) Notice: Subject to any disclaimer, the term of this patent is extended or adjusted under 35 U.S.C. 154(b) by 150 days.

(21) Appl. No.: 16/285,937

(22) Filed: Feb. 26, 2019

(65) Prior Publication Data

US 2020/0268204 A1 Aug. 27, 2020

(51) Int. Cl.
*A47J 37/07* (2006.01)

(52) U.S. Cl.
CPC .................. *A47J 37/0786* (2013.01)

(58) Field of Classification Search
CPC .... F24B 13/008; A47J 37/0786; B65D 21/00; B65D 21/02
USPC ...... 220/573.4, 753.5, 571, 571.1, 572, 573, 220/23.83, 23.86, 23.87, 23.88, 23.89, 220/751; 248/690, 691
See application file for complete search history.

(56) References Cited

U.S. PATENT DOCUMENTS

| | | | | |
|---|---|---|---|---|
| 1,399,680 A | * | 12/1921 | Airgood | B65D 7/34 220/327 |
| 4,501,572 A | * | 2/1985 | Hook | F16D 3/84 464/170 |
| 4,538,727 A | * | 9/1985 | Solloway | A45C 11/00 206/203 |
| 4,756,445 A | * | 7/1988 | Agee, Sr. | B65F 1/08 220/23.89 |
| 4,862,795 A | | 9/1989 | Hawkins | |
| 4,879,990 A | * | 11/1989 | Clark | A47J 37/0704 126/25 R |
| 4,909,137 A | | 3/1990 | Brugnoli | |
| 5,456,163 A | | 10/1995 | Ceravolo | |
| 5,582,094 A | | 12/1996 | Peterson | |
| 6,155,248 A | | 12/2000 | Schlosser | |
| D483,224 S | | 12/2003 | Clark | |
| 7,328,696 B2 | * | 2/2008 | Rodriguez | A47J 37/0704 126/30 |
| 7,694,849 B1 | * | 4/2010 | Wiesner | B65D 35/28 222/1 |
| 7,971,760 B1 | * | 7/2011 | Winkler | A01C 7/02 222/465.1 |
| 2008/0191436 A1 | * | 8/2008 | Galgano | B65H 49/325 280/47.11 |
| 2017/0020336 A1 | | 1/2017 | Cole | |
| 2018/0007883 A1 | * | 1/2018 | Langley | B65D 43/22 |

* cited by examiner

*Primary Examiner* — Allan D Stevens

(57) ABSTRACT

A grease pan expansion assembly for capturing grease that would otherwise spill from an overflowing grease pan in a cooking grill includes a container that is positionable around an existing grease pan in a cooking grill. The container has a fluid capacity that is greater than the fluid capacity of the existing grease pan. Thus, the container inhibits grease from spilling out of the cooking grill when the existing grease pan becomes full. A bolt is extendable through the container and the existing grease pan thereby releasably coupling the container to the existing grease pan. A handle is attached to the existing grease pan and engages the container for emptying the existing grease pan.

5 Claims, 4 Drawing Sheets

GREASE PAN EXPANSION ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to grease pan devices and more particularly pertains to a new grease pan device for capturing grease that would otherwise spill from an overflowing grease pan in a cooking grill.

BRIEF SUMMARY OF THE INVENTION

An embodiment of the disclosure meets the needs presented above by generally comprising a container that is positionable around an existing grease pan in a cooking grill. The container has a fluid capacity that is greater than the fluid capacity of the existing grease pan. Thus, the container inhibits grease from spilling out of the cooking grill when the existing grease pan becomes full. A bolt is extendable through the container and the existing grease pan thereby releasably coupling the container to the existing grease pan. A handle is attached to the existing grease pan and engages the container for emptying the existing grease pan.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
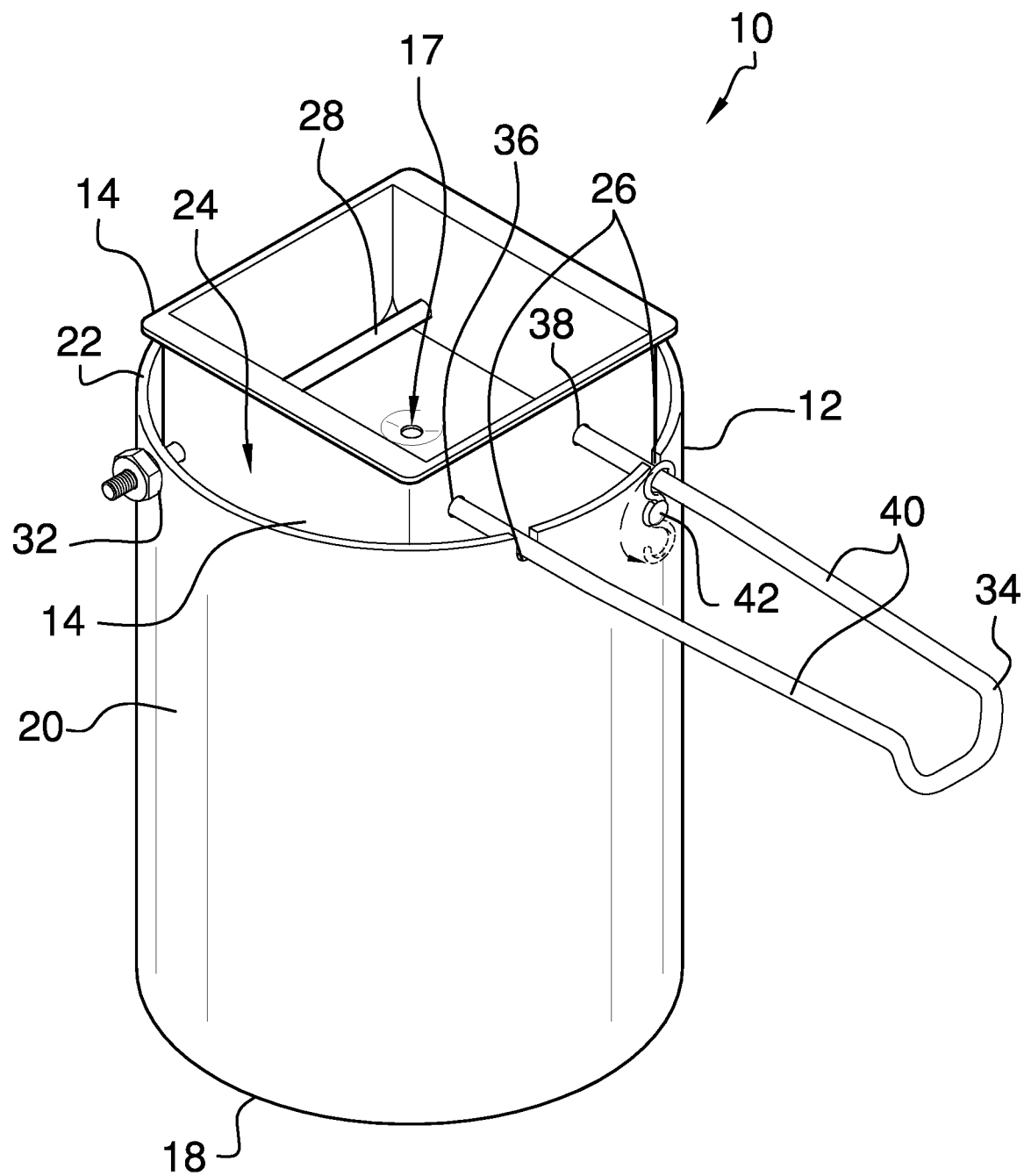
FIG. 1 is a top perspective view of a grease pan expansion assembly according to an embodiment of the disclosure.
Figure 2:
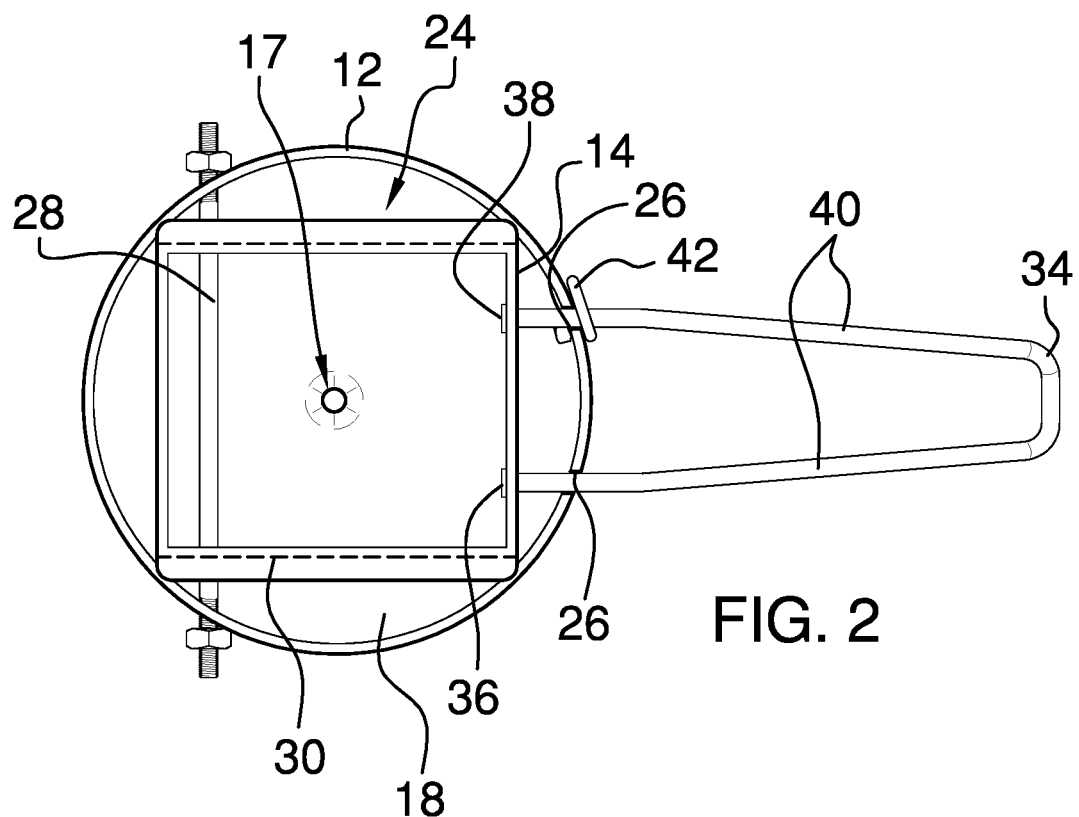
FIG. 2 is a top view of an embodiment of the disclosure.
Figure 3:
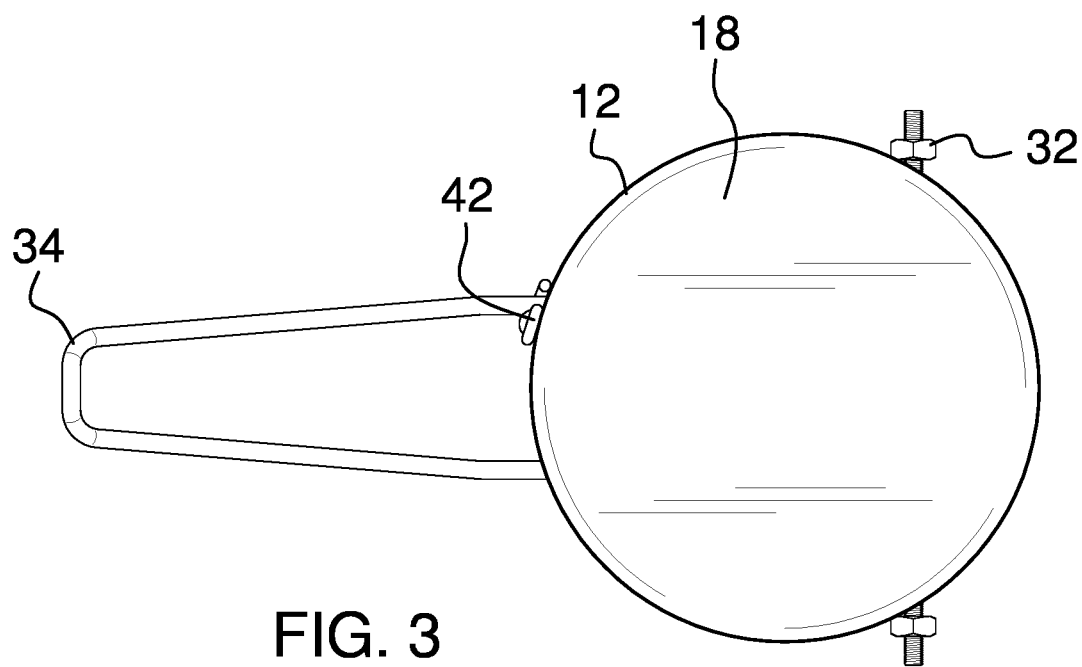
FIG. 3 is a bottom view of an embodiment of the disclosure.
Figure 4:
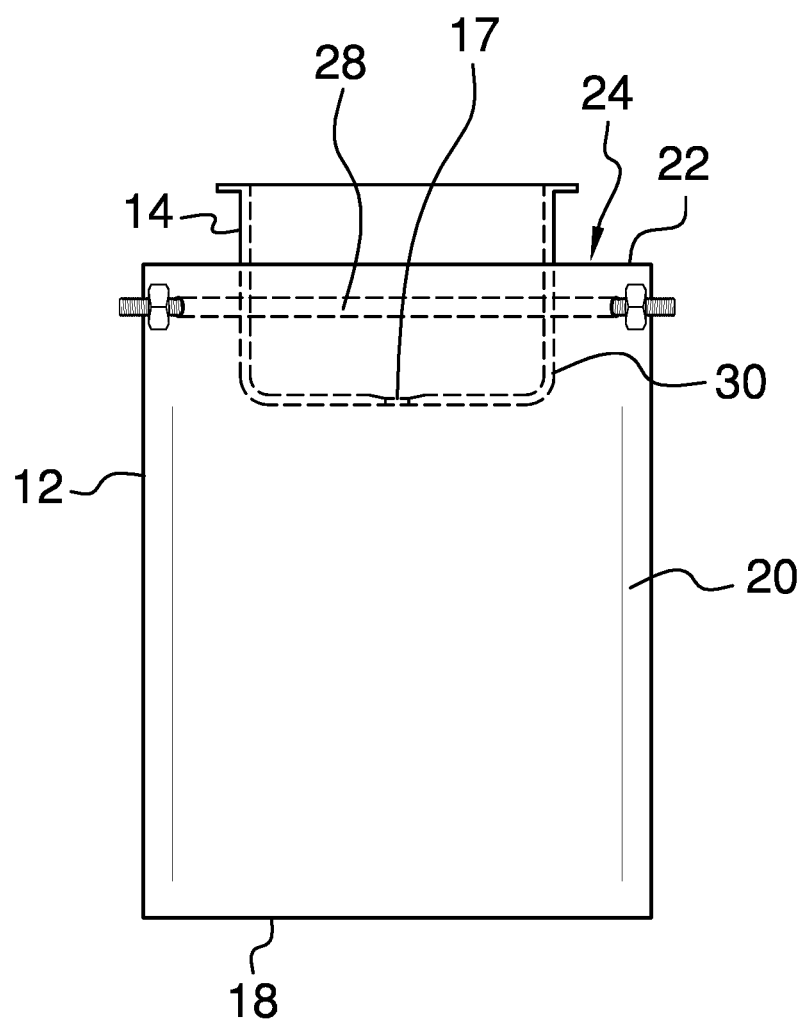
FIG. 4 is a front phantom view of an embodiment of the disclosure.
Figure 5:
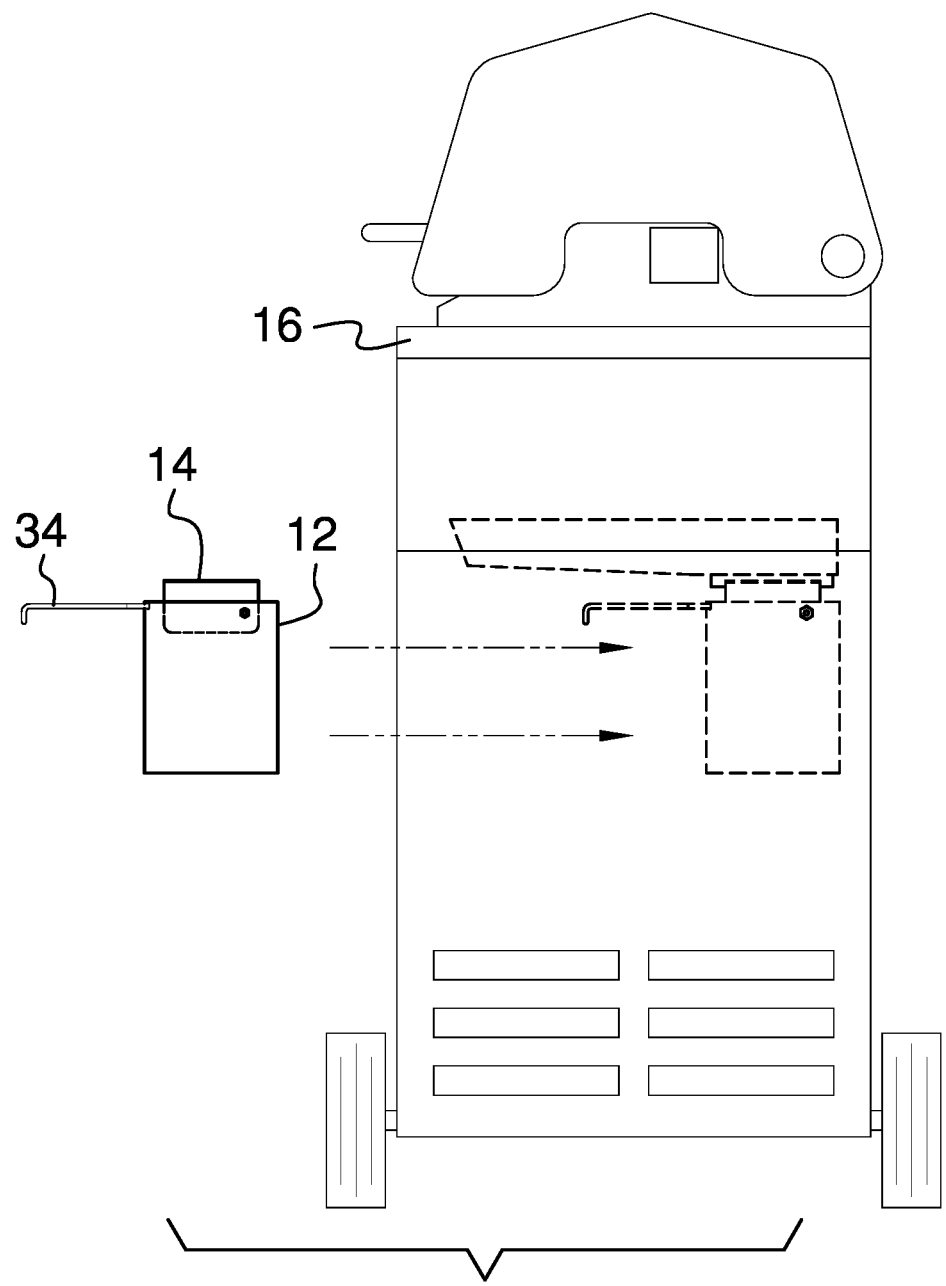
FIG. 5 is a perspective in-use view of an embodiment of the disclosure.

With reference now to the drawings, and in particular to FIGS. 1 through 5 thereof, a new grease pan expansion assembly embodying the principles and concepts of an embodiment of the disclosure and generally designated by the reference numeral 10 will be described.

As best illustrated in FIGS. 1 through 5, the grease pan expansion assembly 10 generally comprises a container 12 that is positionable around an existing grease pan 14 in a cooking grill 16. The cooking grill 16 may be a gas grill, a charcoal grill or any other type of cooking grill. The container 12 has a fluid capacity that is greater than the fluid capacity of the existing grease pan 14. In this way the container 12 captures grease that would otherwise spill out of the cooking grill 16 when the existing grease pan 14 becomes full. As is most clearly shown in FIGS. 1 and 2, the existing grease pan 14 may have a drain 17 or the like for selectively draining the existing grease pan 14.

The container 12 has a bottom wall 18 and an outer wall 20 extending upwardly therefrom. The outer wall 20 has a distal edge 22 with respect to the bottom wall 18 defining an opening 24 into the container 12 and the existing grease pan 14 is positioned in the opening 24. The distal edge 22 has a pair of slots 26 each extending downwardly toward the bottom wall 18, and the slots 26 are spaced apart from each other on the distal edge 22. The outer wall 20 of the container 12 may be continuously arcuate about a vertical axis of the container 12 such that the container 12 has a cylindrical shape.

A bolt 28 is extendable through the container 12 and the existing grease pan 14 thereby releasably coupling the container 12 to the existing grease pan 14. The bolt 28 extends through the outer wall 20 of the container 12 and an outside wall 30 of the existing grease pan 14. A nut 32 threadably engages the bolt 28 thereby retaining the bolt 28 in the container 12 and the existing grease pan 14. A handle 34 is attached to the existing grease pan 14 and the handle 34 engages the container 12. Thus, the handle 34 can be gripped for emptying the existing grease pan 14.

The handle 34 has a first end 36 and a second end 38, and each of the first end 36 and the second end 38 is attached to the outside wall 30 of the existing grease pan 14. The handle 34 is curved between each of the first end 36 and the second end 38 to define a pair of arms 40 of the handle 34 that is spaced apart from each other. Moreover, each of the arms 40 rests in a respective one of the slots 26 in the distal edge 22 of the container 12.

A catch 42 is provided and the catch 42 is rotatably coupled to the container 12. The catch 42 is positionable in a locked position having the catch 42 engaging the handle 34 for retaining the handle 34 on the container 12. The catch 42 is positioned on the outer wall 20 of the container 12 and the catch 42 is aligned with a respective one of the slots 26. The catch 42 engages the arm 40 of the handle 34 that is resting in the respective slot 26 when the catch 42 is positioned in the locked position. The catch 42 may comprise an S shaped hook that is capable of releasably engaging the arm 40 in the respective slot 26.

In use, the container 12 is positioned around the existing grease pan 14 and the bolt 28 is extended through each of the container 12 and the existing grease pan 14. Thus, the container 12 is attached to the existing grease pan 14. The catch 42 is manipulated to engage the handle 34 thereby facilitating both of the container 12 and the existing grease pan 14 to be carried with the handle 34. The container 12 captures any grease that would otherwise spill from the cooking grill 16 when the existing grease pan 14 becomes full. The handle 34 is gripped for removing the container 12 and existing grease pan 14 from the cooking grill 16 for emptying or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grease pan expansion assembly comprising:
   a container being positionable around a grease pan in a cooking grill, said container having a fluid capacity being greater than a fluid capacity of the grease pan wherein said container is configured to inhibit grease from spilling out of the cooking grill when the grease pan becomes full;
   a bolt being insertable through said container and the grease pan thereby releasably coupling said container to the grease pan; and
   a handle being attached to the grease pan and engaging said container wherein said handle is configured to be gripped for emptying the grease pan.

2. The assembly according to claim 1, wherein:
   said container has a bottom wall and an outer wall extending upwardly therefrom, said outer wall having a distal edge with respect to said bottom wall defining an opening into said container, said opening having the grease pan being positioned therein, said distal edge having a pair of slots each extending downwardly toward said bottom wall, said slots being spaced apart from each other on said distal edge; and
   said bolt extends through said outer wall of said container and an outside wall of the grease pan.

3. The assembly according to claim 2, wherein said handle has a first end and a second end, each of said first and second ends being attached to the outside wall of the grease pan, said handle being curved between each of said first and second ends to define a pair of arms of said handle being spaced apart from each other, each of said arms resting in a respective one of said slots in said distal edge of said container.

4. The assembly according to claim 2, further comprising a catch being rotatably coupled to said container, said catch being positionable in a locked position having said catch engaging said handle for retaining said handle on said container, said catch being positioned on said outer wall of said container, said catch being aligned with a respective one of said slots, said catch engaging an arm of said handle that is resting in said respective slot when said catch is positioned in said locked position.

5. A grease pan expansion assembly comprising:
   a container being positionable around a grease pan in a cooking grill, said container having a fluid capacity being greater than a fluid capacity of the grease pan wherein said container is configured to inhibit grease from spilling out of the cooking grill when the grease pan becomes full, said container having a bottom wall and an outer wall extending upwardly therefrom, said outer wall having a distal edge with respect to said bottom wall defining an opening into said container, said opening having the grease pan being positioned therein, said distal edge having a pair of slots each extending downwardly toward said bottom wall, said slots being spaced apart from each other on said distal edge;
   a bolt being insertable through said container and the grease pan thereby releasably coupling said container to the grease pan, said bolt extending through said outer wall of said container and an outside wall of the grease pan;
   a nut threadably engaging said bolt thereby retaining said bolt in said container and the grease pan;
   a handle being attached to the grease pan and engaging said container wherein said handle is configured to be gripped for emptying the grease pan, said handle having a first end and a second end, each of said first and second ends being attached to the outside wall of the grease pan, said handle being curved between each of said first and second ends to define a pair of arms of said handle being spaced apart from each other, each of said arms resting in a respective one of said slots in said distal edge of said container; and
   a catch being rotatably coupled to said container, said catch being positionable in a locked position having said catch engaging said handle for retaining said handle on said container, said catch being positioned on said outer wall of said container, said catch being aligned with a respective one of said slots, said catch engaging said arm of said handle that is resting in said respective slot when said catch is positioned in said locked position.

* * * * *